United States Patent [19]

Stone et al.

[11] 4,292,179
[45] Sep. 29, 1981

[54] SPIN-ON FILTER COALESCER UNIT WITH FLOW REVERSING BAFFLE ASSEMBLY

[75] Inventors: Walter H. Stone, Madison, Wis.; William G. Nostrand, Snelling, Calif.

[73] Assignee: Nelson Industries, Inc., Stoughton, Wis.

[21] Appl. No.: 151,946

[22] Filed: May 21, 1980

[51] Int. Cl.³ .................... B01D 33/38; B01D 27/00
[52] U.S. Cl. .................. 210/443; 210/456; 210/DIG. 17; 210/DIG. 5
[58] Field of Search ......... 210/440, 443, 456, DIG. 5, 210/DIG. 17

[56] References Cited

U.S. PATENT DOCUMENTS 3,929,643 12/1975 Donaldson et al. .... 210/DIG. 17 X

Primary Examiner—Frank A. Spear, Jr.
Attorney, Agent, or Firm—Andrus, Sceales, Starke & Sawall

[57] ABSTRACT

A spin-on filter coalescer unit having a flow reversing assembly. The filter-coalescer unit includes a cylindrical body which contains an annular filter element surrounded by a coalescing element, and a final separation stage is spaced radially outward of the coalescing element. A cover encloses the open end of the body and is provided with a central outlet port and a plurality of circumferentially spaced inlet ports. The flow reversing assembly comprises a pair of baffle members, one of which can be the cover, which are spaced apart to define a chamber that communicates with the outlet. A plurality of tubular connecting members form sealed conduits extending through the baffle member and establish communication between the inlet ports and the central axial passage within the filter element. Liquid entering the unit through the circumferentially spaced inlet ports flows through the tubular connectors and into the central passage, and then outwardly through the filter and coalescer elements and separation stage to the outer circumferential passage between the separation stage and the body, and then axially through the circumferential passage for discharge, via the chamber between the baffle members, through the outlet.

10 Claims, 6 Drawing Figures

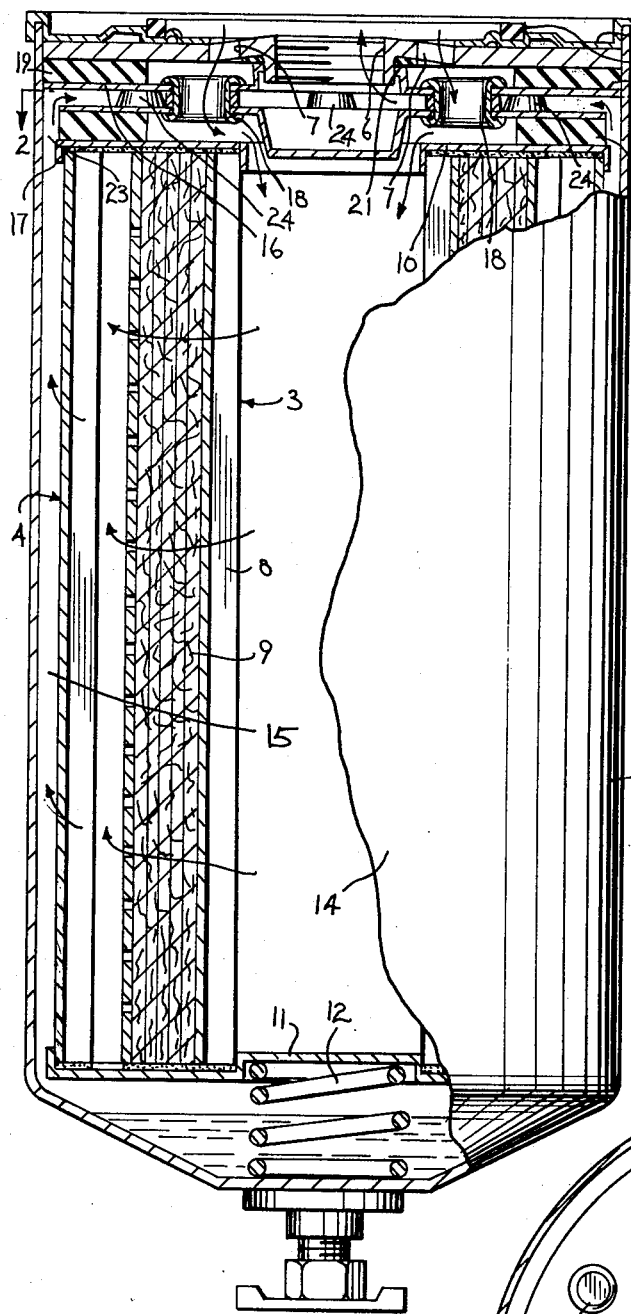
FIG.1
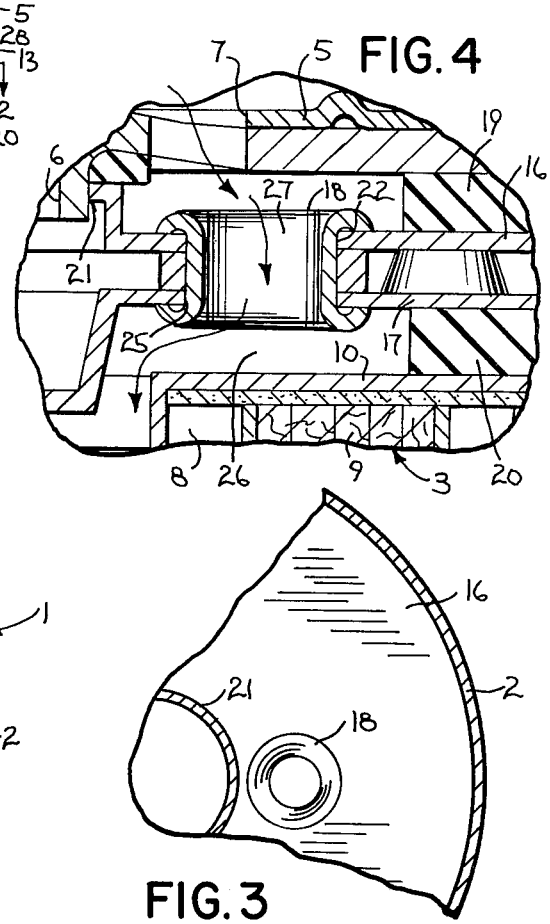
FIG.4
FIG.3
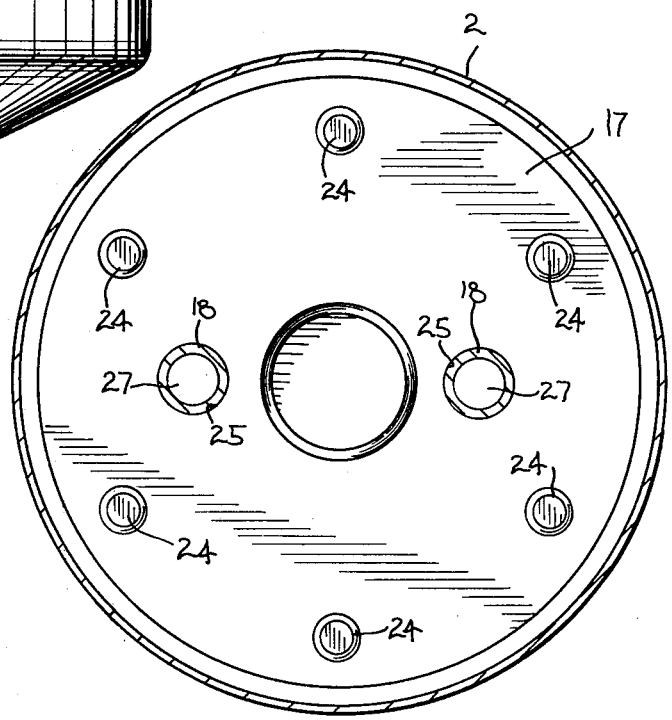
FIG.2

SPIN-ON FILTER COALESCER UNIT WITH FLOW REVERSING BAFFLE ASSEMBLY

BACKGROUND OF THE INVENTION

Fuel-water coalescers are commonly used in fuel systems to remove entrained water from hydrocarbon fuels. The removal of water is particularly important in diesel and gas turbine engines where entrained water can seriously reduce service life of fuel injectors and pumps. The typical coalescer includes an annular coalescing element formed of a series of superimposed layers of fibrous material constructed in a manner to allow a graded particle capture. The flow direction is from the inside-out, which creates a decrease in velocity as the diameter of the element increases. The decrease in velocity aids in coalescing the fine water droplets into larger globules that will fall by gravity along the outer surface of the element to the bottom of the unit for collection.

On the other hand, fuel filters used for trapping contaminants and particulate matter have traditionally utilized an outside-in flow. The outside-in flow provides a greater surface area on the outside of the element which reduces the tendency for the element to clog.

It may be desirable at times to substitute a coalescer or a combined filter-coalescer for the conventional filter. If the filter is connected to the engine block by connecting hoses, the change to the coalescer can be readily made by reversing the lines to the coalescer. However, most current fuel filters are of the spin-on type in which the filter is threaded into the engine block so that a simple hose line conversion to a coalescer cannot be made. In situations such as this, reversing the flow to accommodate the coalescer has been achieved by utilizing a flow reversing adapter which is positioned between the engine block and the spin-on coalescer. However, auxiliary adapters are expensive to produce, double the potential for leaks and take up valuable space that could otherwise be alloted to filtering or coalescing media. In addition, the use of an adapter makes it difficult to use the original filter element in conditions of emergency.

SUMMARY OF THE INVENTION

The invention is directed to a filter-coalescer unit having an improved flow reversing baffle assembly.

In accordance with the invention, the flow reversing assembly includes an outer baffle, which can either be the cover of the filter-coalescer unit or a separate baffle located beneath the cover, and is formed with a central outlet opening. An inner baffle is spaced from the outer baffle to define a chamber therebetween and connected to the outer baffle by a plurality of tubular connecting members which form sealed conduits that extend through the spaced baffles and establish communication between the inlet in the unit and an axial passage within the annular filter-coalescer element.

By virtue of this assembly, liquid entering the unit flows through the tubular connecting members into the central passage within the filter-coalescer element. The liquid then flows outwardly through the element to the outer circumferential passage adjacent the casing and then axially through the circumferential passage for discharge via the chamber between the baffles, thus resulting in a reversal of flow from outside-in to inside-out.

The baffle assembly can be manufactured from inexpensive sheet metal stampings and is more compact than the prior art external adapters, thus allowing more interior space to be allocated to filter or coalescer media.

The placement of the baffle assembly inside the coalescer cover also eliminates the potential filter-to-head leaks that were present with the use of external adapters.

DESCRIPTION OF THE DRAWINGS

The drawings illustrate the best mode presently contemplated of carrying out the invention.

In the drawings:

FIG. 1 is a side elevation of a filter-coalescer unit incorporating the flow reversing baffle assembly of the present invention;

FIG. 2 is a section taken along line 2—2 of FIG. 1 and showing the inner baffle member;

FIG. 3 is a fragmentary plan view of the outer baffle member;

FIG. 4 is an enlarged fragmentary side view of the baffle members and a connecting member;

DESCRIPTION OF THE PREFERRED EMBODIMENT

Figure 5:
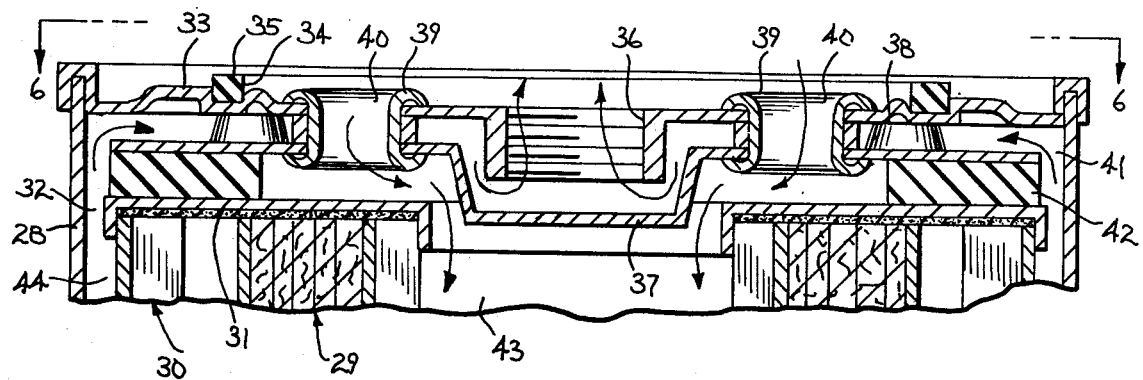
FIG. 5 is a fragmentary vertical section showing a modified form of the flow reversing baffle assembly.

The drawings illustrate a filter-coalescer unit 1, having a flow reversing baffle assembly. The filter-coalescer unit 1 includes a cylindrical container or body 2 and an annular filter-coalescer element 3 is disposed centrally within the container 2, while a final separator element 4 is spaced outwardly of the filter-coalescer element 3. The unit 1 also includes a cover 5 which is crimped to the outer end of body 2 and has a central outlet port 6 and circumferentially spaced inlet ports 7.

The filter-coalescer element 3 is a conventional type and, in general, includes an inner pleated filter 8 and an outer fibrous, multi-layer coalescer element 9. The separator element 4 is formed of water repellant pleated paper. Both the filter-coalescer element 3 and separator unit 4 are disposed between an upper ring member 10 and a base ring member 11. A spring 12 engages base ring 11 and urges the filter coalescer element 3 and separator element 4 into contact with the flow reversing baffle assembly 13. The disposition of filter-coalescer element 3 and separator element 4 inside container 2 is such that they define an axial passage 14 and an outer circumferential passage 15.

The flow reversing baffle assembly 13, located between cover 5 and upper ring member 10, consists of an outer baffle 16, an inner baffle 17 and tubular connecting members 18. Upper gasket 19 seals outer baffle 16 to cover 4, while lower gasket 20 seals inner baffle 17 to upper ring 10.

Outer baffle member 16 has a diameter substantially equal to the inner diameter of body 2 and includes a centrally located outlet 21 and circumferentially spaced inlets 22. Outlet 21 and inlets 22 communicate respectively with outlet port 6 and inlet ports 7 of cover 5.

Inner baffle 17 has a diameter somewhat less than the inner diameter of body 2 so as to define a corridor 23 which communicates with circumferential passage 15. Baffle 17 includes a plurality of outwardly projecting spacers 24 and circumferentially spaced holes 25 located so as to align with inlets 22 of outer baffle 16.

Spacers 24 engage the inner surface of outer baffle 16 and define a chamber 26 between outer baffle 16 and inner baffle 17.

Tubular connecting members 18 connect the aligned holes 22 and 25 and have their edges deformed outwardly in order to provide sealed conduits 27 across chamber 26.

In use, the threaded outlet port 6 of cover 5 is spun onto a threaded nipple (not shown) of an engine block and the inlet ports 7 align with corresponding ports (not shown) on the engine block. Gasket 28 on cover 5 engages the engine block and prevents leakage at the junction.

As is shown by the arrows in FIG. 1, the liquid from the engine block enters inlet ports 7, flows through the sealed conduits 27 formed by tubular connecting members 18 and is directed into axial passage 14. The liquid then passes through filter-coalescer element 3 and separator element 4, longitudinally in circumferential passage 15 to chamber 26 for return to the engine block via outlet port 6. The use of the baffle assembly thus results in an inside-out flow rather than the customary outside-in flow.

Figure 6:
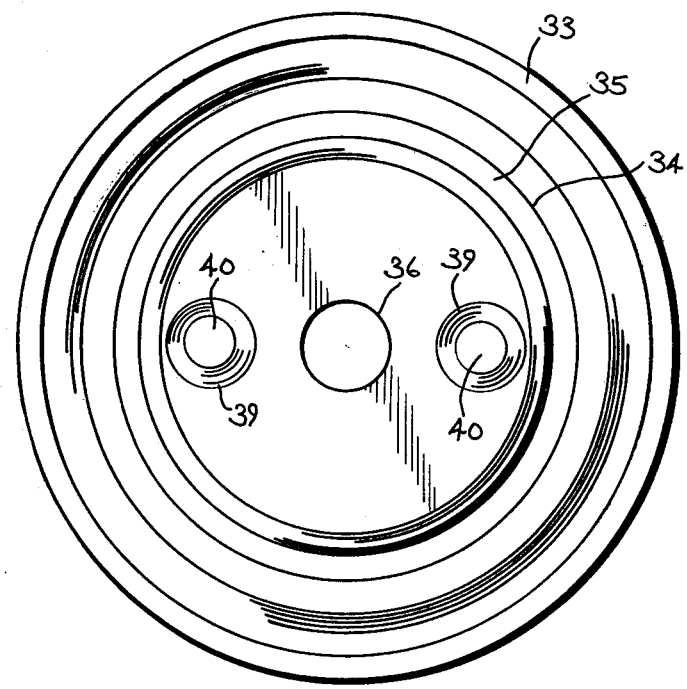
FIG. 6 is a section taken along line 6—6 of FIG. 5.

FIGS. 5 and 6 illustrate a modified form of the invention in which the cover serves as one of the baffles in the flow reversing baffle assembly. In the structure shown in FIGS. 5 and 6, the filter-coalescer unit includes an open end outer body or casing 28 which houses a filter-coalescer element 29 and an outer separator element 30, similar in construction and function to the filter-coalescer element 3 and separator element 4, previously described.

The filter-coalescer element 29 and separating element 30 are retained between an upper ring 31 and a lower ring, not shown, and the peripheral edge of the upper ring 31 is spaced from the body 28 to provide an annular passage 32.

The open end of the body 28 is enclosed by a cover 33, the outer edge of which is crimped to the end of the body. Cover 33 is provided with a circular groove 34 which receives a gasket 35 that is adapted to engage the engine block to seal the joint between the engine block and the filter-coalescer unit. The central portion of the cover 33 is formed with a threaded outlet 36 which is adapted to be threaded onto a nipple on the engine block.

In addition to the cover or baffle 33, the flow reversing baffle assembly includes an inner baffle 37 which is spaced from cover 33 to define a chamber 38 that communicates with the outlet 36. A plurality of tubular connecting members 39, similar to connecting members 18, interconnect the cover 33 and baffle 37 and provide sealed conduits 40.

As shown in FIG. 6, the peripheral edge of the inner baffle 37 is spaced from the body 28 to provide a passage 41 and the inner surface of baffle 37 is sealed to the upper ring 31 by the annular seal 42.

With the construction shown in FIGS. 5 and 6, the tubular connecting members 39 are aligned with outlet ports in the engine block, so that the fuel will enter the filter-coalescer unit through the connecting members 39 and then flow into the central passage 43 defined by the filter-coalescer element 29. After flowing outwardly through the filter-coalescer element 29 and the separator element 30, the fuel will flow longitudinally through the outer passage 44, through passages 32 and 41 and into the chamber 38 for discharge through the central outlet 36.

The construction shown in FIGS. 5 and 6 provides a simple and inexpensive flow reversing assembly which changes the customary outside-in flow to inside-out flow. In this construction, the cover of the unit constitutes one of the baffles of the flow reversing baffle assembly, thereby further reducing the overall cost of the unit.

While the above description has shown the flow reversing baffle assembly associated with a filter-coalescer unit, it is contemplated that the flow reversing assembly can be used with various other types of separating units in which contaminants, such as particulate matter, water and the like are removed from a liquid.

Various modes of carrying out the invention are contemplated as being within the scope of the following claims particularly pointing out and distinctly claiming the subject matter which is regarded as the invention.

We claim:

1. A flow reversing device for a spin-on liquid separator unit having a cylindrical container having an open end, an annular separating element disposed within the container and defining an axial passage and an outer circumferential passage, a first baffle member disposed adjacent the open end and having a centrally located outlet opening; a second baffle member spaced inwardly from said first baffle member to define a chamber between said baffle members, said chamber connecting the circumferential passage to the outlet opening, and conduit means connecting said first and second baffle members and extending across said chamber, whereby liquid entering said conduit means flows into the axial passage of the separating element, said liquid then flowing radially outward through the separating element and longitudinally in the circumferential passage to said chamber for discharge through the outlet opening.

2. The flow reversing device of claim 1, further comprising a plurality of spacer members connected to one of said baffle members and engageable with the other of said baffle members to define said chamber between said baffle members.

3. The flow reversing device of claim 1, wherein said conduit means comprises a plurality of tubular members located radially outwardly of said outlet opening.

4. The flow reversing device of claim 3, further comprising sealing means to seal said tubular members to said baffle members and to prevent liquid in said tubular members from entering said chamber.

5. The flow reversing device of claim 1, wherein the peripheral edge of said second baffle member is spaced from the container to provide a passage that establishes communication between said circumferential passage and said chamber.

6. The flow reversing device of claim 1, wherein said baffle members are sheet metal stampings.

7. The flow reversing device of claim 3, wherein said tubular members have radially outwardly deformed ends, said ends being sealed to the first and second baffle members respectively.

8. The flow reversing device of claim 1, wherein said first baffle member comprises a cover and is secured to the open end of the container.

9. The flow reversing device of claim 1, and including a cover secured to the open end of the container, said first baffle member being located inwardly of said cover, said cover having a central outlet port communicating with the outlet opening in said first baffle member and having at least one inlet aperture communicating with said conduit means.

10. A flow reversing device for a spin-on liquid separator unit having a cylindrical container having an open end, an annular separating element disposed within the container and defining an axial passage and an outer circumferential passage, a first baffle member secured to the open end of the container and having a centrally located outlet opening; a second baffle member spaced inwardly from said first baffle member to define a chamber between said baffle members, the peripheral edge of said second baffle member being spaced from the wall of the container to provide a clearance, said clearance providing communication between said outer circumferential passage and said chamber, and a plurality of tubular members interconnecting said baffle members and extending across said chamber, said tubular members defining conduits sealed from said chamber, whereby liquid is introduced to said tubular members and flows through said tubular members to said axial passage, said liquid then flowing radially outward through the separating element and longitudinally in the circumferential passage to said chamber for discharge through the outlet opening.

* * * * *